United States Patent
Kim et al.

(10) Patent No.: US 7,856,382 B2
(45) Date of Patent: Dec. 21, 2010

(54) AGGREGATE USER DEFINED FUNCTION (UDF) PROCESSING FOR MULTI-REGRESSION

(75) Inventors: Edward Kim, Toronto (CA); Harminter Atwal, Framingham, MA (US); Arash Bateni, Toronto (CA); Lorenzo Danesi, Richmond Hill (CA)

(73) Assignee: Teradata US, Inc., Miamisburg, OH (US)

( * ) Notice: Subject to any disclaimer, the term of this patent is extended or adjusted under 35 U.S.C. 154(b) by 167 days.

(21) Appl. No.: 11/967,621

(22) Filed: Dec. 31, 2007

(65) Prior Publication Data

US 2009/0177559 A1 Jul. 9, 2009

(51) Int. Cl.
G06Q 10/00 (2006.01)
G06F 17/00 (2006.01)
G06F 7/00 (2006.01)

(52) U.S. Cl. .............................. 705/28; 707/100; 707/4; 707/102

(58) Field of Classification Search ..................... 707/2, 707/4, 100, 102, 104.1, 12, 775, 101, 776, 707/99.104; 718/104
See application file for complete search history.

(56) References Cited

U.S. PATENT DOCUMENTS

| | | | | |
|---|---|---|---|---|
| 5,325,525 | A * | 6/1994 | Shan et al. | 718/104 |
| 6,067,542 | A * | 5/2000 | Carino, Jr. | 1/1 |
| 7,024,414 | B2 * | 4/2006 | Sah et al. | 1/1 |
| 7,136,850 | B2 | 11/2006 | Keller et al. | |
| 7,188,098 | B2 * | 3/2007 | Chen et al. | 1/1 |
| 7,283,982 | B2 | 10/2007 | Pednault | |
| 7,376,656 | B2 * | 5/2008 | Blakeley et al. | 717/108 |
| 2004/0128287 | A1 | 7/2004 | Keller et al. | |
| 2004/0128289 | A1 * | 7/2004 | Cochrane et al. | 707/4 |
| 2005/0010093 | A1 * | 1/2005 | Ford et al. | 600/345 |
| 2005/0044063 | A1 * | 2/2005 | Barsness et al. | 707/2 |
| 2005/0080820 | A1 * | 4/2005 | Koppel et al. | 707/104.1 |
| 2005/0177579 | A1 * | 8/2005 | Blakeley et al. | 707/100 |
| 2006/0041544 | A1 * | 2/2006 | Santosuosso | 707/4 |
| 2007/0022136 | A1 | 1/2007 | Keller et al. | |
| 2008/0059115 | A1 * | 3/2008 | Wilkinson | 702/179 |
| 2008/0189239 | A1 * | 8/2008 | Bawa et al. | 707/2 |
| 2008/0250057 | A1 * | 10/2008 | Rothstein et al. | 707/102 |
| 2009/0018982 | A1 * | 1/2009 | Morrison | 706/12 |
| 2009/0018989 | A1 * | 1/2009 | Chang et al. | 707/2 |
| 2009/0019005 | A1 * | 1/2009 | Hu et al. | 707/3 |
| 2009/0077019 | A1 * | 3/2009 | Todd | 707/2 |

(Continued)

OTHER PUBLICATIONS

Torsha Banerjee, Kaushik Chowdhury, Dharma P. Agrawal. "Distributed Data Aggregation in Sensor Networks by Regression Based Compression." IEEE International Conference on Mobile Adhoc and Sensor System, Nov. 2005 ; Retrieved from IEEE Xplore, Jul. 21, 2010.*

(Continued)

*Primary Examiner*—Matthew S Gart
*Assistant Examiner*—Olusegun Goyea
(74) *Attorney, Agent, or Firm*—Schwegman, Lundberg & Woessner

(57) ABSTRACT

An aggregate User Defined Function (UDF) processing used for multi-regression is provided. The aggregate UDF initializes storage space for multiple nodes of a database environment. Data is then extracted from a relational database and populated according to groupings on each of the nodes. Multiple rows or records are then processed to create a merge and multi-regression processed.

20 Claims, 4 Drawing Sheets

U.S. PATENT DOCUMENTS

2009/0177559 A1* 7/2009 Kim et al. .................... 705/28
2009/0187584 A1* 7/2009 Johnson et al. ............. 707/100

OTHER PUBLICATIONS

Michael Mychalczuk. "Drowning in data." Security Management Nov. 1, 2002: ABI/INFORM Global, ProQuest. Web. Jul. 21, 2010.*

Elisabet Service, Sini Maury, and Emilia Luotoniemi. "Individual differences in phonological learning and verbal STM span." Memory & Cognition 35.5 (2007): 1122-1135. ABI/INFORM Global, ProQuest. Web. Jul. 21, 2010.*

John J Coffey. "Statistical modeling in an MCIF." ABA Bank Marketing Nov. 1, 2002: ABI/INFORM Global, ProQuest. Web. Jul. 21, 2010.*

* cited by examiner

AGGREGATE USER DEFINED FUNCTION (UDF) PROCESSING FOR MULTI-REGRESSION

BACKGROUND

Enterprises are increasingly capturing, storing, and mining a plethora of information related to communications with their customers. Often this information is stored and indexed within databases. Once the information is indexed, queries are developed on an as-needed basis to mine the information from the database for a variety of organizational goals: such as planning, analytics, reporting, etc.

Many times the information stored and indexed is created, mined, updated, and manipulated by application programs created by developers on behalf of analysts. These programs are referred to as user-defined functions (UDF's).

The information stored in the databases also provides enterprises with an opportunity to derive relationships or patterns from that information; the relationships and patterns can be transformed into functions that when supplied certain input variables produce projected output values, which the enterprises can rely on. Such scenarios are particularly useful in projecting the impact of sales given certain predefined expected or anticipated conditions. This approach often involves mathematical regression algorithms.

One issue with regression analysis is the large amounts of information typically needed to produce meaningful and reliable results. The traditional manner in which this is done is via a tabular UDF that requires all the data to be packed into a single row of a database table. This is taxing on the server having the table and on the users that use the server and are dependent on results of the tabular UDF.

Therefore, it can be seen that improved techniques for processing regression analysis in a relational database environment are needed.

SUMMARY

In various embodiments, techniques for aggregate user-defined function (UDF) processing used with multi-regression are provided. According to an embodiment, a method for an aggregate UDF used in multi-regression analysis is described. An intermediate storage structure is initialized to house regression input variables for multiple nodes of a database environment. Data is gathered from a database into the intermediate storage structures on each node. Year week data found on each of the nodes is merged together, via the intermediate storage structure, and the merged data pertaining to a same product stock keeping unit (SKU). The merged year week data is placed on a particular node of the database environment. Finally, a regression service is processed for each SKU on each node.

DETAILED DESCRIPTION

Overview

Multi-regression technique has been employed to develop a causal model to:
  establish a cause-effect relationship between demand and the potential influencing factors; and
  calculate promotional uplift and demand forecast based on the casual relationship.

A novel aggregate User Defined Function (UDF) is presented for improving processing throughput of multi-regression analysis.

Current Approaches

Varbyte Packing System is a data packing method to input a large number of data items into a tabular UDF. The packing is needed for tabular UDFs since they accept a maximum of 128 input parameters at a time.

Multi-regression involves several factors from several rows of observations, which have to be fed in as a single record input into the tabular UDF.

Four years of observations of each factor need to be packed into two varbytes, each varbyte storing up to 105 observations.

Current Varbyte Representation

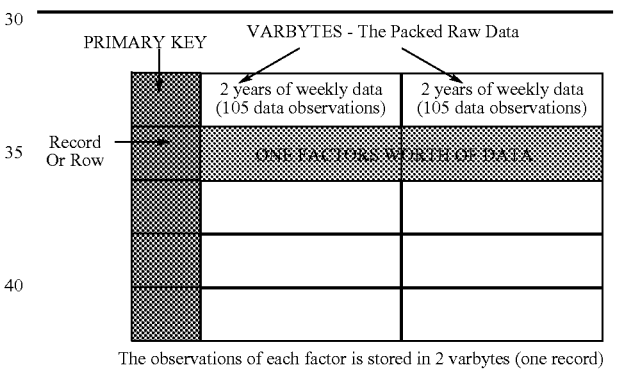

The observations of each factor is stored in 2 varbytes (one record)

Pack the raw data: response variable (weekly sales) and independent factors (price, promotional flags . . . ).

Pack each of the observations at a SKU level into 2 large VARBYTES per factor. Each containing 105 data observations.

This scheme is due to the fact that varbytes each map 2 years (each with 52-53 weeks) of history.

For each regression model, all the data points for all the factors are packed into one record.

The techniques presented herein can run the tabular UDF regression on a record by record basis.

Main Shortcomings of Current Solutions

Complication with using the UDF regression, due to the overhead of packing varbytes.

Some full or left outer join required to estimate missing data; outer joins are expensive and slow.

Using the varbytes to input into the tabular UDF, our rows (records) would be oversized, as they would pack all observations of factors pertaining to a particular SKU. The Row Ref. Array scans will be far less effective, and the system more I/O encumbered.

Novel Solution to Current Shortcomings

An Aggregate UDF essentially collects and summarizes data across many records and yields one output.

It consists of four principle phases:
AGR_INIT
AGR_DETAIL
AGR_COMBINE
AGR_FINAL

AGR_INIT Processing

Initial set up of the regression intermediate storage structure.

This occurs once per SKU, setting up the temporary space for use on a particular AMP (Application Module Processor).

To ensure better performance, distribute data by the grouped columns. This will reduce merging activities in later phases.

The Three Remaining Modules

AGR_DETAIL is run once per record, and is used to accumulate data into our intermediate storage structure.

AGR_COMBINE merges YearWeek data found on the different AMPs pertaining to the same SKU. It then places the data onto one particular AMP.

AGR_FINAL run the Regression for each SKU on each AMP.

An Illustration of AGR Stages

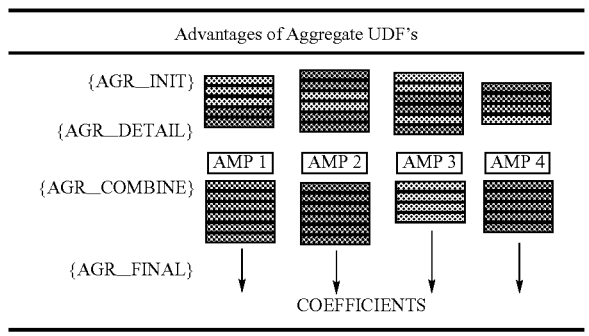

Advantages of Aggregate UDF's

Figure 4:
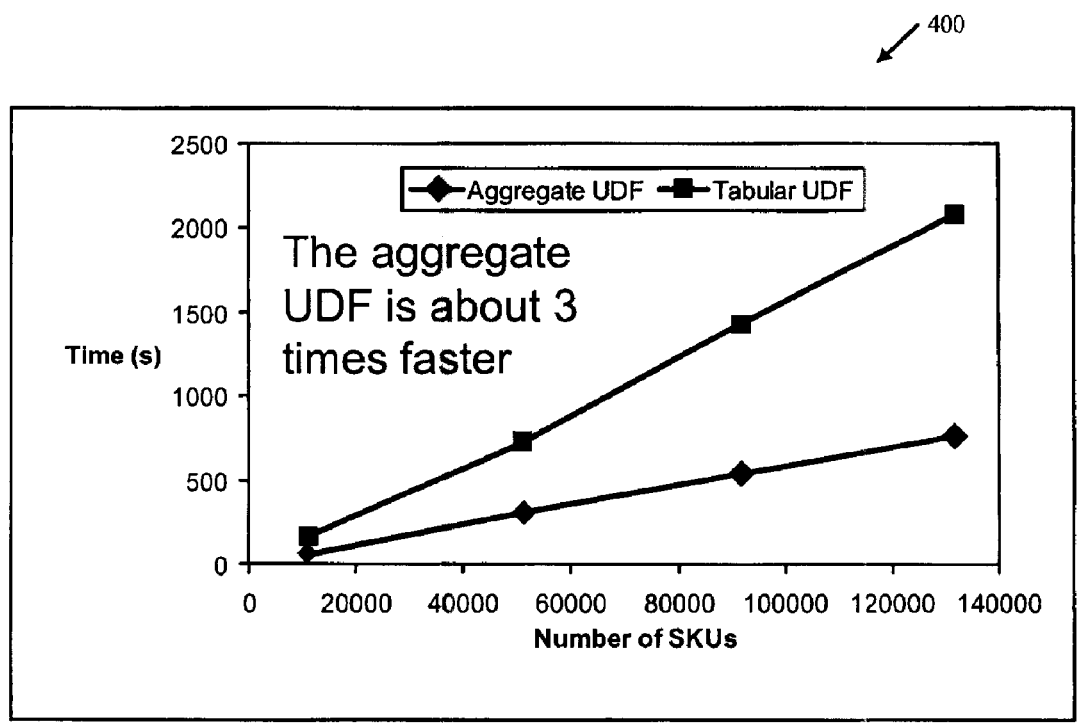
FIG. 4 is a chart illustrating performance gains associated with an Aggregate UDF v. a Tabular UDF.

Less Confusion/Setup to actually run a regression function.
No need to pack variables into varbytes.
Large Performance Gains.
No added overhead of pivoting and shifting large amounts of data to form single SKU records.
No Oversized/Large Rows FIG. 4 is a chart 400 illustrating performance gains associated with an Aggregate UDF v. a Tabular UDF. Chart 400 shows that the aggregate UDF is about three times faster than the tabular UDF.

It is within this context that specific embodiments of the above-discussed aggregate UDF and its processing are discussed with reference to the FIGS. 1-3.

Figure 1:
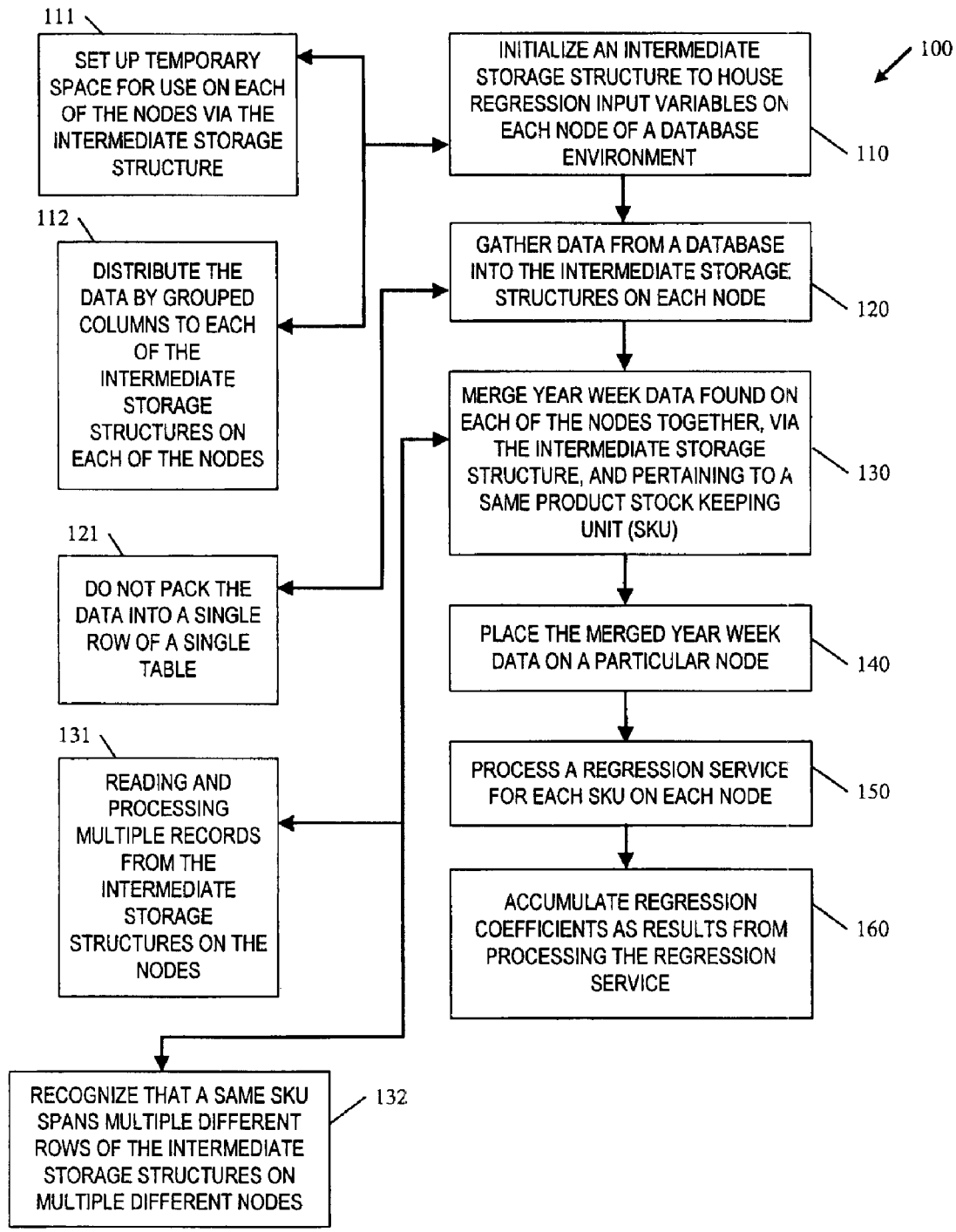
FIG. 1 is a diagram of a method for aggregate user-defined function (UDF) processing used with multi-regression, according to an example embodiment.

FIG. 1 is a diagram of a method 100 for aggregate user-defined function (UDF) processing used with multi-regression, according to an example embodiment. The method 100 (hereinafter "aggregate UDF service") is implemented in a machine-accessible or computer-readable medium as instructions that when executed by a plurality of machines (e.g., computers, processing devices, etc.) performs the processing depicted in FIG. 1. Moreover, the aggregate UDF service is accessible over a network. The network may be wired, wireless, or a combination of wired and wireless.

A "database" as used herein is a relational database, or a collection of databases organized as a data warehouse.

According to an embodiment, the database is a Teradata® product or service distributed by Teradata of Dayton, Ohio.

The database includes a variety of enterprise information organized in tables. One type of information is referred to as an "entity." An entity is something that can be uniquely identified (e.g., a customer account, a customer name, a store, a product, a household name, a logical grouping of certain types of customers, etc.). Each entity includes related information such as sales, expenses, inventories, transaction history, etc. In fact, the relationships and types of information can vary and can be configured in any manner desired by an enterprise.

It is within this context that the processing associated with the aggregate UDF service is now described in detail with reference to the FIG. 1.

Essentially, the aggregate UDF service collects and summarizes data (information) across many records and yields a single output. This is achieved via breaking the processing into four primary phases. In phase one the aggregate UDF service initializes processing; phase two collects details, phase three combines the details, and phase four produces the final regression results associated with regression analysis algorithms or services.

Traditionally, the approach has been to pack a large number of data items (fields) from a relational database into a single row of a table to perform regression analysis. This had some obvious performance issues, such as the UDF itself could only process a finite number of variables, such as 128. Yet, with regression analysis the more factors or variables the more reliable results can be. Generally, several voluminous years of data is passed to a regression analysis algorithm via a single tabular UDF. There is overhead associated with the complicated packing of variables to avoid system limits and processing is slow with increasingly encumbered Input/Output (I/O) performance.

The aggregate UDF service and its four processing phases solve these problems by reading and processing multiple rows, such that packing and single row processing is no longer needed.

At 110, the aggregate UDF service initializes an intermediate storage structure to house regression input variables on each node of a database environment. So, in a multiple processor environment, each node is utilized and a storage structure is set up to house data that is used in a particular regression analysis scenario.

According to an embodiment, at 111, the aggregate UDF service essentially sets up temporary space for use on each of the nodes via the intermediate storage structure. Thus, each node/process has the necessary space and storage to handle its piece of the regression input data that is to be used in the multi-regression analysis.

In an embodiment, at 112, the aggregate UDF service distributes the data by grouped columns to each of the intermediate storage structures on each of the nodes. This ensures better performance and reduces merging activities in later processing steps, discussed below.

At 120, the aggregate UDF service gathers data from a database into the intermediate storage structures on each node. This is the input data being analyzed for the regression analysis and is what conventionally was packed into a single row of a single table. Here, multiple rows are permitted on multiple nodes and the data is housed in intermediate storage structures on each of the nodes.

So, at 121, the aggregate UDF service does not pack into a single row of a single table as was discussed above.

At 130, the aggregate UDF service merges year week data found on each of the nodes together, via the intermediate storage structure, and pertaining to a same product stock keeping unit (SKU).

At 131, the aggregate UDF service reads and processes multiple records from the intermediate storage structures on the nodes. Also, at 132, the aggregate UDF service recognizes that a same SKU spans multiple different rows of the intermediate storage structures on multiple different nodes.

At 140, the aggregate UDF service processes a multi-regression service for each SKU on each node. Thus, at 150, the aggregate UDF service accumulates and outputs regression coefficients as results from processing the regression service.

The processing of the aggregate UDF service reads and processed multiple rows rather than one monolithic row of a single table. As was discussed in detail above in the discussion that preceded the discussion of the FIG. 1, this scenario results in a 300% or more performance improvement over the convention approach.

Figure 2:
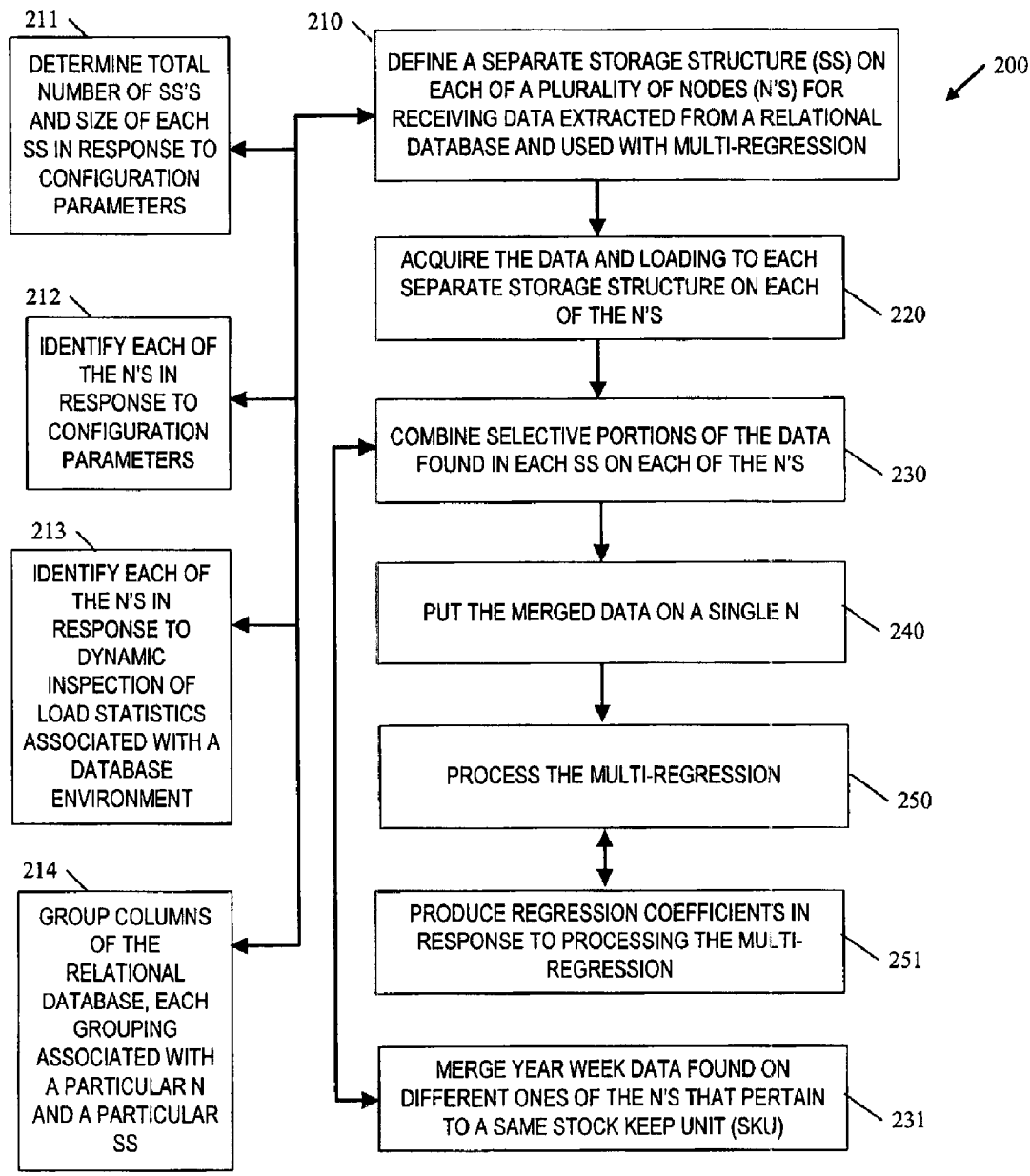
FIG. 2 is a diagram of another method for aggregate UDF processing used with multi-regression, according to an example embodiment.

FIG. 2 is a diagram of another method 200 for aggregate UDF processing used with multi-regression, according to an example embodiment. The method 200 (hereinafter "aggregation service") is implemented in multiple machine-accessible and readable media as instructions that when executed by machines perform the processing reflected in FIG. 2. The aggregation service is accessible over a network. The network may be wired, wireless, or a combination of wired and wireless.

The aggregation service presents an enhanced view and different aspect of the aggregate UDF service presented above and represented by the method 100 of the FIG. 1.

At 210, the aggregation service defines a separate storage structure on each of a plurality of nodes within a database environment. The storage structures house information associated with various groupings of that information as extracted from a relational database; the sum of the groupings associated with input values to a database regression analysis service.

According to an embodiment, at 211, the aggregation service determines a total number of storage structures and the size that each storage structure is to be on its respective nodes in response to configuration parameters.

Similarly, at 212, the aggregation service can identify each of the nodes that are to be used for the storage structures in response to configuration parameters.

In yet another situation, at 213, the aggregation service can identify each of the plurality of nodes in response to a dynamic evaluation or the processing load associated with the database environment. So, the selection and identity of particular nodes to use can be made based on real-time evaluation of the database environment and corresponding load metrics associated with the nodes of the database environment.

In an embodiment, at 214, the aggregation service groups columns of the relational database, each grouping associated with a particular node and a particular separate storage structure.

At 220, the aggregation service acquires the data and loads that data to each separate storage structure on each of the nodes.

At 230, the aggregation service combines selective portions of the data found in each separate storage structure on each of the nodes.

According to an embodiment, at 231, the aggregation service merges year week data found on different ones of the nodes that pertain to a same stock keeping unit (SKU). This was discussed at length above.

At 240, the aggregation service processes the multi-regression. So, at 241, the aggregation service produces regression coefficients in response to processing the multi-regression.

Figure 3:
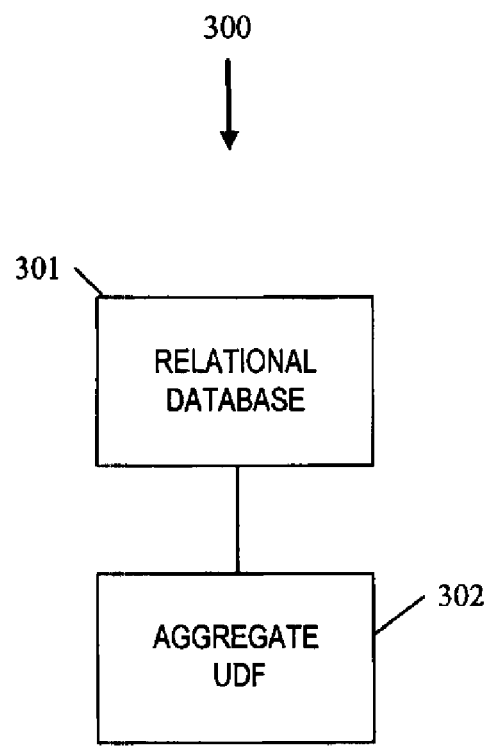
FIG. 3 is an aggregate UDF processing system, according to an example embodiment.

FIG. 3 is an aggregate UDF processing system 300, according to an example embodiment. The aggregate UDF processing system 300 is implemented in a machine-accessible and readable media and is operational over a network and processed by multiple machines of the network. The network may be wired, wireless, or a combination of wired and wireless. In an embodiment, portions of the aggregate UDF processing system 300 implements, among other things the aggregate UDF service and the aggregation service represented by the methods 100 and 200 of the FIGS. 1 and 2, respectively.

The aggregate UDF processing system 300 includes relational database 301 and an aggregate UDF 302. Each of these and their interactions with one another will now be discussed in turn.

The relational database 301 is implemented in a machine-accessible and computer-readable medium and accessible to the aggregate UDF 302. The relational database 301 includes the data that is being used for multi-regression and data captured by an enterprise for goods and services that are tracked by stock keeping units (SKU's).

The aggregate UDF 302 is implemented in a machine-accessible and computer-readable medium and to process on multiple nodes of a database environment.

Example processing associated with the aggregate UDF 302 is presented in detail above with reference to the discussion that preceded the FIGS. and with reference to the FIGS. 1 and 2, respectively.

The aggregate UDF 302 extracts data from the relational database 301 for use in multi-regression and populates groupings of that data to separate nodes of the database environment. The aggregate UDF 302 reads and processes multiple rows for a same stock keeping unit (SKU) across the nodes and houses results in a particular one of the nodes. Also, the aggregate UDF 302 processes the multi-regression desired for a particular product or service of an enterprise.

In an embodiment, the aggregate UDF 302 sets up intermediate storage structures on each of the nodes to house the groupings of the extracted data. Also, the aggregate UDF 302 sets up the intermediate storage structures once per SKU on each node.

According to an embodiment, the aggregate UDF 302 generates the groupings by columns associated with the relational database 301. Moreover, the aggregate UDF 302 accumulates data into the intermediate storage structures once per record.

In one situation, the aggregate UDF 302 merges year week data found on different ones of the nodes that pertain to the same SKU.

It is now appreciated how multiple rows or records may be processed at once using an aggregate UDF 302. Heretofore, this has not been practicable or feasible and thus the techniques presented herein offer substantial performance improvements over existing conventional approaches.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on processing devices, comprising:
   initializing, using an aggregate user-defined function (UDF) on each of the processing devices, an intermediate storage structure to house regression input variables on each of the processing device of a database environment;
   gathering, using the aggregate UDF on each of the processing devices, data from a database into the intermediate storage structures on each processing device;
   merging, using the aggregate UDF on each of the processing devices, year week data pertaining to a same product stock keeping unit (SKU) found on each of the processing devices together, via the intermediate storage structure;
   placing, on each processing device, merged year week data of the same product SKU; and
   processing, using the aggregate UDF on each of the processing devices, a regression service for each SKU on each processing device.

2. The method of claim 1 further comprising, accumulating, on the each of the processing devices, regression coefficients as results from processing the regression service.

3. The method of claim 1, wherein initializing further includes setting up temporary space for use on each of the nodes via the intermediate storage structure.

4. The method of claim 1, wherein initializing further includes distributing the data by grouped columns to each of the intermediate storage structures on each of the nodes.

5. The method of claim 1, wherein gathering further includes not packing the data into a single row of a single table.

6. The method of claim 1, wherein merging further includes reading and processing multiple records from the intermediate storage structures on the nodes.

7. The method of claim 6, wherein merging further includes recognizing that a same SKU spans multiple different rows of the intermediate storage structures on multiple different nodes.

8. A machine-implemented method to execute on processing devices, comprising:
   defining, using an aggregate user-defined function (UDF) on each of the processing devices, a separate storage structure on each of the processing devices for receiving data extracted from a relational database and used with multi-regression;
   acquiring, using the aggregate UDF on each of the processing devices, the data and loading to each separate storage structure on each of the processing devices;
   combining, using the aggregate UDF on each of the processing devices, same product stock keeping unit (SKU) data found in each separate storage structure on each of the processing devices;
   putting, on each processing device, merged data of the same product SKU; and
   processing, using the aggregate UDF on each of the processing devices, the multi-regression for each SKU on each processing devices.

9. The method of claim 8, wherein defining further includes determining a total number of storage structures and a size for each of the storage structures in response to configuration parameters.

10. The method of claim 8, wherein defining further includes identifying each of the plurality of nodes in response to the configuration parameters.

11. The method of claim 8, wherein defining further includes identifying each of the plurality of nodes in response to inspection of dynamic load statistics associated with a database environment.

12. The method of claim 8, wherein defining further includes grouping columns of the relational database, each grouping associated with a particular node and a particular separate storage structure.

13. The method of claim 8, wherein combining further includes merging year week data found on different ones of the nodes that pertain to a same stock keeping unit (SKU).

14. The method of claim 8, wherein processing further includes producing regression coefficients in response to processing the multi-regression.

15. A system comprising: a relational database implemented in a machine-accessible and non-transitory computer-readable medium and accessible to an aggregate user-defined function (UDF); and
   the aggregate UDF implemented in a machine-accessible and non-transitory computer-readable medium and to process on multiple nodes, which are processing devices, of a database environment;
   the aggregate UDF extracts data from the relational database for use in multi-regression and populates groupings of that data to separate processing devices of the database environment, and the aggregate UDF reads and processes multiple rows for a same stock keeping unit (SKU) across and on each of the processing devices and houses results for the same SKU on a particular one of the processing devices, and the aggregate UDF processes the multi-regression for each SKU on each of the processing devices.

16. The system of claim 15, wherein the aggregate UDF sets up intermediate storage structures on each of the nodes to house the groupings of the extracted data.

17. The system of claim 16, wherein the aggregate UDF sets up the intermediate storage structures once per SKU on each node.

18. The system of claim 15, wherein the aggregate UDF generates the groupings by columns associated with the relational database.

19. The system of claim 18, wherein the aggregate UDF accumulates data into the intermediate storage structures once per record.

20. The system of claim 15, wherein the aggregate UDF merges year week data found on different ones of the nodes that pertain to the same SKU.

* * * * *